350-316
CROSS REFERENCE
SEARCH ROOM

INVENTOR
TOSHIRO WATANABE
BY Lewis H. Eslinger
ATTORNEY

COLOR VIDEO SIGNAL GENERATING APPARATUS

Filed July 13, 1967 2 Sheets-Sheet 2

INVENTOR
TOSHIRO WATANABE
BY
Lewis H. Eslinger
ATTORNEY 3,524,014

COLOR VIDEO SIGNAL GENERATING APPARATUS

Toshiro Watanabe, Zushi-shi, Japan, assignor to Sony Corporation, Tokyo, Japan, a corporation of Japan Filed July 13, 1967, Ser. No. 653,252
Claims priority, application Japan, July 15, 1966 41/46,443
Int. Cl. H04n 5/26
U.S. Cl. 178—5.4 5 Claims

ABSTRACT OF THE DISCLOSURE

The color video signal generating apparatus described employs a single monochrome image pickup tube. A series of lenses is disposed in front of the tube and divides a real image of the object to be televised into stripe-like image elements which are projected on the photoconductive layer of the tube. A color filter is positioned in front of the separating lens assembly and has several filtering regions which pass light of different wavelengths. The composite video signal is composed of signals having the same center frequency but different phases.

This invention relates generally to a color video signal generating apparatus and more particularly to such apparatus which produces sequential color video signals corresponding to the color components of an object to be televised.

The present invention is directed to improvement in or relating to the color video signal generating apparatus described in my pending U.S. applications Ser. No. 645,727, which corresponds to Japanese patent application No. 38,672/66, and Ser. No. 646,045, which corresponds to Japanese patent application No. 38,671/66. In accordance with the invention in the former patent application, dot-sequential color video signals are produced through the use of a single image pickup tube, but separation of the dot-sequential color video signals into primary color signals requires incorporation of marker signals into the video signals. The construction of apparatus, however, for incorporation of such marker signals and of means for separating the video signal is relatively difficult and complex. Further, satisfactory color separation cannot be accomplished with such apparatus unless the frequency characteristic of the image pickup tube is considerably wide, so that the invention of the former application cannot be applied to a simplified apparatus.

In the latter patent application, apparatus has been described and illustrated such that a plurality of color video signals of different center frequencies are obtained by the use of a specific color filter, and the color video signals are decoded into primary color signals through the use of bandpass filters. However, this requires a frequency band which is substantially three times wider than the frequency band necessary for one color signal and it is impossible to produce cheaply an image pickup tube capable of responding to such a high frequency.

In view of the foregoing, the primary object of the present invention is to provide apparatus by which a plurality of color components of an object to be televised are produced in the form of a composite video signal composed of signals having the same center frequency but different phases. The composite video signal is then phase-demodulated and separated into its respective color components.

Another object of the present invention is to provide a color video signal generating apparatus to produce a composite video signal composed of signals having the same center frequency so that the required frequency band can be made narrow. In this manner, color video signals of sufficient resolution can be obtained by the use of image pickup tubes having comparatively poor frequency characteristics, such as a videcon tube.

A further object of the present invention is to provide a color video signal generating apparatus which is particularly suited for use in color cameras to be used for industrial or domestic purposes.

These and further objects, features and advantages of the present invention will appear from a reading of the following detailed description of a preferred embodiment of the invention which is to be read in conjunction with the accompanying drawings wherein like components in the several views are identified by the same reference numeral.

Figure 6:
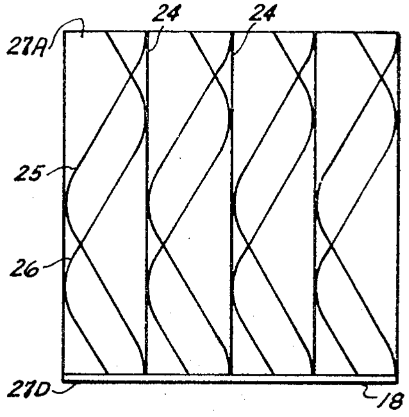
Figure 7:
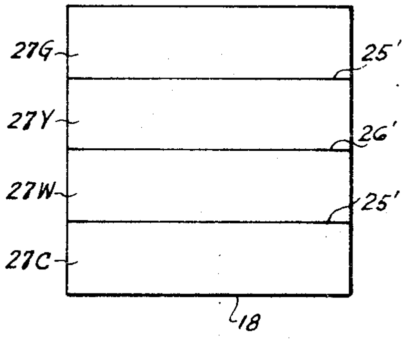

FIGS. 5A to 5D, inclusive, are color signal waveforms;

FIGS. 6 and 7 are schematic diagrams illustrating other examples of color filters; and FIGS. 8A to 8D, inclusive, are schematic diagrams showing various modifications of the lens screen.

Figure 1:
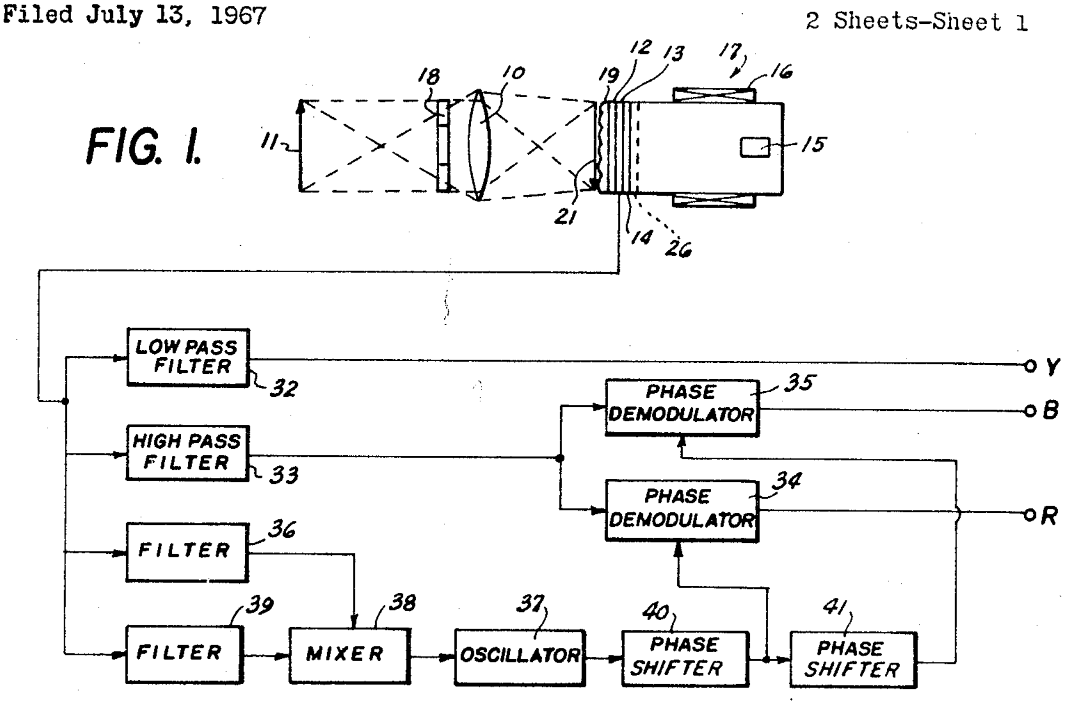
FIG. 1 is a schematic diagram, partly in section, illustrating one example of a color video signal generating apparatus in accordance with the present invention.

The present invention employs apparatus which is the same as that illustrated in the aforementioned U.S. patent applications Ser. Nos. 645,727 and 646,045, except in the construction of the color camera and the color filter. That is, the present invention employs as an image pickup tube a vidicon tube 17 such as shown in FIG. 1. The vidicon tube 17 includes a face plate 12 which faces the object 11 to be televised, a transparent electrode 13 provided on or close to the face plate 12, a photo-electric conversion layer 14, such for example as a photoconductive layer 14 formed on the transparent electrode 13, a mesh electrode 26 disposed adjacent the photoconductive layer 14, an electron gun 15 disposed opposite the aforementioned components and a deflection device 16 mounted about the tube 7 causing an electron beam emitted from the electron gun 15 to scan and focus on the photoconductive layer 14.

Figure 2:
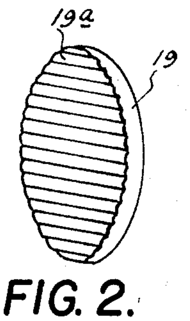
FIG. 2 is a schematic perspective view of a lens screen.

A color filter 18, such as is hereinafter described, is positioned between the object 11 and the face plate 12 of the vidicon tube 17 and in opposing relation thereto, and a lens screen 19, made up of many cylindrical lenses *9a* such as depicted in FIG. 2, is disposed in front of the face plate 12 in such a manner that the longitudinal axis of each cylindrical lens **19*a* crosses the horizontal scanning direction of the vidicon tube 17. Between the lens screen 19 and the color filter 18 a camera lens 10 is positioned in such a manner as to project a real image 21 of the object 11 on the face of the lens screen 19**.

Figures 3A, 3B, 3C:
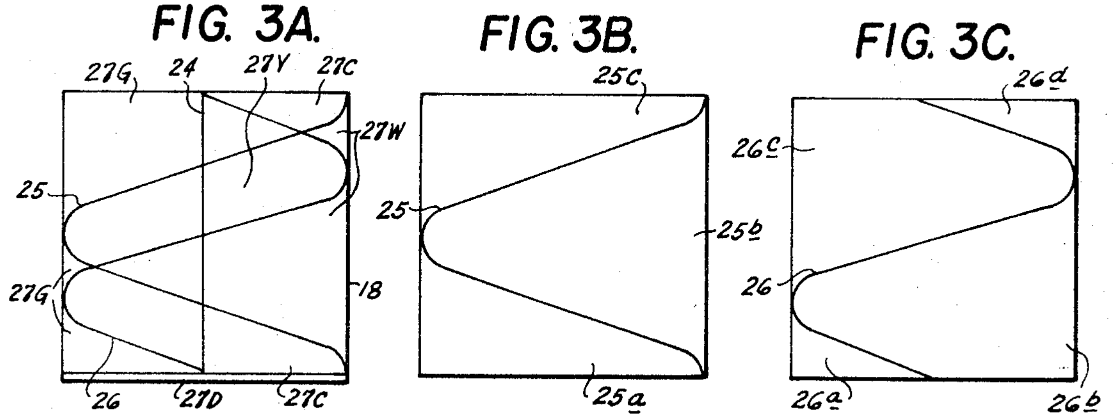
FIGS. 3A to 3C are schematic diagrams illustrating how the various regions of a color filter are defined.

The color filter 18, as illustrated in FIG. 3A, consists of a plurality of regions formed by two sinusoidal curves 25 and 26 which are phased 90 degrees apart along their common reference line 24. The color filter 18 is divided into three regions **25*a*, 25*b* and 25*c* by the curve 25 as illustrated in FIG. 3B, and is further divided into four regions 26*a*, 26*b*, 26*c* and 26*d* by the curve 26 as depicted in FIG. 3C. As clearly shown in FIG. 3A, the overlapping portions of the regions 25*a* and 26*b* and of the regions 25*c* and 26*d* serve as a cyan color filter region 27C, with the other remaining portions of regions 25*a* and 25*c* which do not overlap regions 26*b* and 26*d* acting as green color filter regions 27G**. The overlapping portions of the regions 25*b*, 26*b* and 26*d* serve as transparent regions 27W, with the other remaining portion of region **25*b* functioning as a yellow color filter region 27Y. In addition, an opaque region 27D is provided on the color filter 18 at least on one side thereof in the direction of the reference line 24. The color filter 18 is disposed so that the reference line 24 of the curves 25 and 26 crosses the longitudinal axes of the cylindrical lenses 19*a* of the lens screen 19** at right angles thereto.

Figure 4:
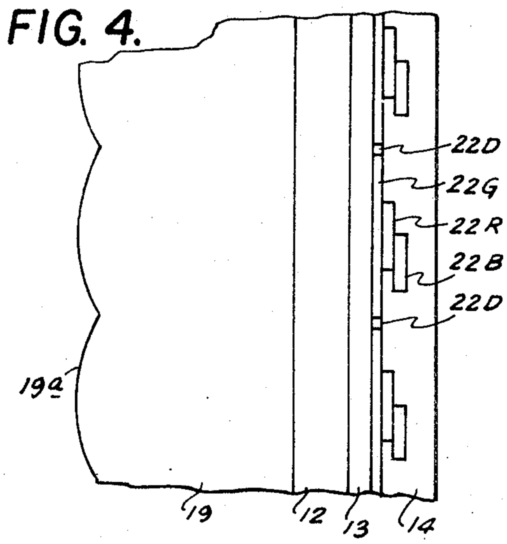
FIG. 4 is an enlarged diagram schematically illustrating color separation by the combination of a color filter and a cylindrical lens in the system depicted in FIG. 1.

With an arrangement such as that described above, the green color component of the light from the object 11 passes through the entire area of the color filter 18, the red color component passes through the color filter regions 27W and 27Y, and the blue color component passes through the color filter regions 27W and 27C. As a result of this, there is produced, on the photoconductive layer 14 in an area corresponding to each cylindrical lens **19*a*, a green color component 22G uniformly distributed in the width direction of the cylindrical lens 19*a*, a red color component 22R and a blue color component 22B, which vary in a sinusoidal manner but are centered about different positions considered transversely with respect to the longitudinal axis of the respective lens 19*a* as shown in FIG. 4. By reason of the opaque region 27D on the filter, the light does not reach the photoconductive layer 14 at positions corresponding to the demarcations or boundaries between adjacent cylindrical lenses 19*a*, as identified at 22D** in the figure.

Figures 5A, 5B, 5C, 5D:
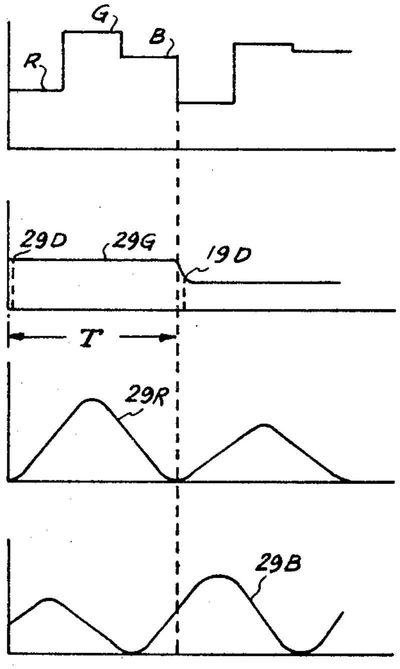

When televising an object by the apparatus of this invention, a color video signal such as shown in FIG. 5A is obtained. The scanning of the photoconductive layer 14 provides, in one scanning period T corresponding to each cylindrical lens **19*a*, a composite signal is obtained from the grid 13, which composite signal is composed of a green color signal 29G having a substantially constant level as depicted in FIG. 5B, a red color signal 29R such as shown in FIG. 5C, whose level varies once in a sinusoidal manner, a blue color signal 29B such as shown in FIG. 5D, whose level varies once in a sinusoidal manner and is displaced 90° apart in phase from the red color signal 29R, and a blanking or synchronizing signal 29D produced at the demarcation 22D between adjacent scanning periods. Thus, during scanning, the composite signal obtained from grid 13 comprises a green color DC signal 29G which, from one period T to the next, may vary in amplitude, an amplitude modulated sinusoidal red color signal 29R with a carrier frequency $f_L$, which is the product of the number of cylindrical lenses 19*a* and the line scanning frequency, an amplitude modulated sinusoidal blue color signal 29B also with a carrier frequency $f_L$ but 90° out of phase with respect to the carrier of the red color signal 29R, and a demarcation or synchronizing signal 29D** of the frequency $f_L$ and which occurs as a train of sharply defined rectangular pulses and hence gives rise to harmonics of the synchronizing or demarcation signal, as at the frequency $2\times f_L$.

In order to separate such a composite color signal into primary color signals, the composite color signal is frequency-separated to separate the green color signal from the red and blue color signals, and the red and blue color signals are thereafter phase-separated from each other. That is, the composite color signal emanating from the electrode 13 is applied to a low-pass filter 32 (having a cut-off frequency which is ½ of the product $f_L$ of the number of the cylindrical lenses **19*a* and the line scanning frequency), and a high-pass filter 33 (having a pass band of $f_L/2$ to $3/2f_L$, or higher than $f_L/2$), as illustrated in FIG. 1. With this arrangement, the low-pass filter 32 provides a luminance signal Y composed of the green color signal 29G and the low-amplitude components of the red and blue color signals, while the high-pass filter 33 provides a composite signal of the red and blue color signals, the latter being applied to phase demodulator circuits 34 and 35**.

The electrode 13 also has connected thereto a filter circuit 36 for detecting the synchronizing or blanking signal 29D which has a frequency $f_L$. The output of the filter circuit 36, and the output of the filter circuit 39, which has a resonance frequency of $2f_L$ and thus responds only to an harmonic of the synchronizing signal 29D, are both applied to a mixer circuit 38 in which the outputs of filter circuits 36 and 39 are mixed or combined to provide peaks occurring in synchronism with the synchronizing or blanking signals 29D, and further in which the mixed signals are sliced at a predetermined level so that only the mentioned peaks provide an output from circuit 38 at the frequency $f_L$ and in synchronism with the signal 29D. Such output from mixer circuit 38 is used to synchronously control a local oscillator circuit 37 which has a frequency $f_L$. The output of the local oscillator circuit 37 is applied to a phase demodulator circuit 34 through a phase shift circuit 40 (which effects a phase shifter of 135° when no delay of the signal in the circuit is considered). The output of the phase shifter circuit 40 is also fed to the phase demodulator circuit 35 through a 90° phase shifter circuit 41. As a result of this, the phase demodulator circuits 34 and 35 respectively demodulate the amplitude modulated red and blue color signals 29R and 29B having carriers which are out of phase by the same phase difference existing between the phase shifted frequencies obtained from phase shifters 40 and 41, and thus provide red and blue color signals R and B at the outputs from demodulators 34 and 35.

In accordance with this invention, color signals can be produced by the use of a single image pickup tube, as has been described in the foregoing. Further, the output from the electrode 13 ranges from 0 to $3/2f_L$ and the frequency band may be ⅔ of that for frequency separation of the composite color signal into the respective color component signals. Therefore, even if a vidicon tube of relatively poor frequency characteristic is used, sufficient resolution can be obtained. In addition, there is a possibility that when the local oscillator circuit 37 is driven by the composite signal resulting from mixing the signals having the frequencies $f_L$ and $2f_L$, the phase of the component of the frequency $f_L$ in the synchronizing signal can be affected by the intensity of the red and blue components of the light from the object 11 to be televised. This possibility can be avoided by picking up every other peak portion of the frequency $2f_L$. That is, stable $f_L$ components of no phase variation can be obtained to ensure accurate color separation.

Figure 8A:
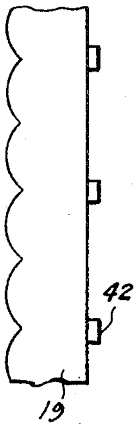
Figure 8B:
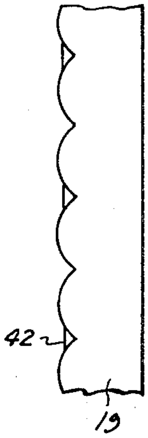
Figure 8C:
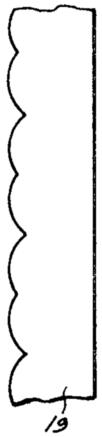

Although the synchronizing signal is obtained by the provision of the opaque portion 27D in the color filter 18 in the foregoing example, the same purpose can be obtained by the deposition of opaque strip members or luminous members 42 such, for example, as electroluminescence on the surface or the back of the lens screen 19 at positions corresponding to alternate demarcations or boundaries of adjacent cylindrical lenses, as illustrated in FIGS. 8A and 8B. Namely, the shadows of the dark portions 22D or lights of the luminous members 23 are projected on the photoconductive layer 14 at corresponding positions. It is also possible to serve the same purpose by the use of a lens screen such as depicted in FIG. 8C, in which the positions of alternate demarcations between adjacent cylindrical lenses are deeper than the others in order to slightly overlap the light images formed by each pair of lenses so that the dark portions 22D appear on the photoconductive layer 14 at positions corresponding to the aforementioned alternate demarcations.

Figure 8D:
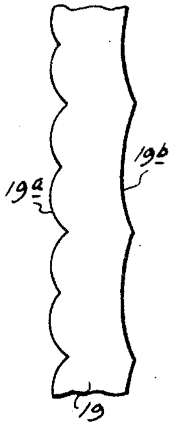

A lens screen such as shown in FIG. 8D can also be employed for the same purpose, in which cylindrical lenses **19*b* are formed on the back of the lens screen, one for each two cylindrical lenses 19*a*, to form dark portions 22D at locations corresponding to the demarcations between adjacent cylindrical lenses 19*b*, so that the dark portions 22D or bright portions appear on the photoconductive layer 14 at positions corresponding to alternate demarcations between adjacent cylindrical lenses 19***a*. In this manner, the synchronizing signals 29D can be obtained.

In these cases, a component of $f_L/2$ is taken out from the composite color signal emanating from the electrode 13 and is then frequency-multiplied twice such that the local oscillator circuit 37 is synchronized with the filter circuit 36. In order to clearly detect the synchronizing signal, a plurality of luminous strip members are provided at predetermined intervales in parallel with the line 24 of the curves 25 and 26 of the color filter 18, and in this case, it is preferred to arrange the luminous strip members so that substantially no light is cast from the luminous members on the photoconductive layer at the dark portions 22D of the synchronizing components, so as not to overlap bias lights except at the portions of the synchronizing signals 29D.

It is preferred in practice to employ a color filter 18 such as depicted in FIG. 6, which comprises a plurality of strip color filter elements elongated in the direction of the reference line 24 of the curves 25 and 26. It is also possible to use such a color filter 18 as shown in FIG. 7, in which the color filter regions are separated by straight lines instead of the curves 25 and 26. That is, as shown in the figure, the color filter 18 is divided into four regions by three lines 25', 26' and 25' parallel with the axes of the cylindrical lenses 19*a*, the four regions serving as a cyan color filter region 27C, a transparent region 27W, a yellow color filter region 27Y and a green color filter region 27G. In this case, a little high-frequency component is produced in the composite signal obtained from the electrode 13, but it gives no disturbance to others.

In order to effect color separation from the composite signal, it is also possible to produce rectangular waves from the separated synchronizing signals, which are synchronized with the synchronizing signals and phased 90° apart from each other, and the output of the filter circuit 33 is gated by the rectangular waves to effect the color separation. The light image is thereby separated by the filter 18 into the red, green and blue components in the foregoing, but it may be separated also into other color components.

It will be apparent that many modifications and variations may be effected without departing from the scope of the novel concepts of this invention.

I claim as my invention:

1. In a color video signal generating apparatus comprising image pickup means having scanning means and being operative to photoelectrically convert light projected onto said image pickup means into an electrical output composed of successive signals corresponding to the intensities of light successively encountered by said scanning means in a line scanning direction, a screen of separating lenses to divide an image of an object to be televised into image elements projected onto corresponding areas of said image pickup means, and filter means interposed optically between the object to be televised and said lens screen and having several regions respectively selecting and passing light of different wavelength ranges; the improvement consisting in said regions of the filter means being spatially arranged and said wavelength ranges thereof being selected to pass one primary color-component through substantially the entire area of said filter means and to pass the other two primary color-components through respective substantially equal areas of said filter means which are overlapped and displaced relative to each other in said line scanning direction so that, in said electrical output, there are repetitive cycles of signals corresponding to the three primary color-components with the signal of each cycle corresponding to said one primary color-component occurring for substantially the entire period of the cycle and the signals corresponding to said other two color-components having the same frequency and being out of phase with respect to each other, frequency responsive means to separate the signals corresponding to said one primary color-component from the signals corresponding to said other two primary color-components, and phase responsive means to separate said signals corresponding to said other two primary color-components from each other.

2. A color video signal generating apparatus according to claim 1, in which said areas of the filter means which pass said other two primary color-components are defined by at least two sinusoidal curves which are displaced in phase with respect to each other.

3. A color video signal generating apparatus according to claim 2, in which said sinusoidal curves are displaced in phase by 90°.

4. A color video signal generating apparatus according to claim 2, in which means are provided to interpose sharply defined demarcation signals in said electrical output between said cycles, and in which said phase responsive means includes filter means to separate from said electrical output signals at the frequency of the demarcation signals and at a harmonic thereof, means to combine the signals from said filter means so as to obtain a control signal at the frequency of said demarcation signals, oscillator means controlled by said control signal to provide an output at the frequency of, and in synchronism with said control signal, demodulating means for each of said other two primary color-components, and phase shifting means through which said output of the oscillator means is applied to each of said demodulating means so that the latter passes only signals corresponding to the respective color component.

5. A color video signal generating apparatus according to claim 4, in which said means to provide said sharply defined demarcation signals includes a region of said filter means defined by margins at right angles to said line scanning direction.

References Cited

UNITED STATES PATENTS

| | | | |
|---|---|---|---|
| 2,733,291 | 1/1956 | Kell. | |
| 2,736,235 | 2/1956 | Toulon | 178—5.4 |
| 2,846,498 | 8/1958 | Toulon | 350—316 |
| 2,892,883 | 6/1959 | Jesty et al. | |
| 2,917,574 | 12/1959 | Toulon. | |

RICHARD MURRAY, Primary Examiner

R. P. LANGE, Assistant Examiner

U.S. Cl. X.R.

178—7.2; 350—316